United States Patent [19]

Lybecker et al.

[11] Patent Number: 4,938,637

[45] Date of Patent: Jul. 3, 1990

[54] METHOD AND APPARATUS FOR BOTTOM LOADING A PNEUMATIC TRANSPORT PRESSURE VESSEL

[76] Inventors: G. Wayne Lybecker, 123 Clair Hill Dr., Rochester, Mich. 48063; Timothy P. Sherrow, 6 Willow Way, Pontiac, Mich. 48054

[21] Appl. No.: 364,782

[22] Filed: Jun. 9, 1989

[51] Int. Cl.$^5$ .................... B65G 53/08; B65G 53/12; B65G 53/56; B65G 53/66

[52] U.S. Cl. ........................... 406/56; 406/146; 406/182; 406/32; 406/25; 406/30; 406/128; 406/122

[58] Field of Search ............... 406/109, 50, 112, 53, 406/56-60, 182, 146, 128, 129, 122, 24, 25, 32, 85, 30; 193/31 R, 31 A

[56] References Cited

U.S. PATENT DOCUMENTS

| | | |
|---|---|---|
| 681,042 | 8/1901 | Cutting . |
| 2,614,002 | 10/1952 | Snow . |
| 3,372,958 | 3/1968 | Black ..................... 406/109 X |
| 3,955,853 | 5/1976 | Rusterholz . |
| 4,036,531 | 7/1977 | Rusterholz ................. 406/109 X |
| 4,059,195 | 11/1977 | MacDonald et al. . |
| 4,073,244 | 2/1978 | Snowdon . |
| 4,137,935 | 2/1979 | Snowdon . |
| 4,157,848 | 6/1979 | Smoot . |
| 4,223,700 | 9/1980 | Jones . |
| 4,252,479 | 2/1981 | Scherfenberg . |
| 4,355,929 | 10/1982 | Snowdon . |
| 4,449,863 | 5/1984 | Ullner . |
| 4,515,503 | 5/1985 | Snowdon . |
| 4,662,799 | 5/1987 | Paul et al. ................. 406/25 X |

FOREIGN PATENT DOCUMENTS

| | | | |
|---|---|---|---|
| 2453950 | 5/1975 | Fed. Rep. of Germany | ......... 406/85 |
| 2758323 | 11/1978 | Fed. Rep. of Germany | ...... 406/182 |

*Primary Examiner*—Joseph F. Peters, Jr.
*Assistant Examiner*—James M. Kannofsky
*Attorney, Agent, or Firm*—Basile and Hanlon

[57] ABSTRACT

The pneumatic conveying system according to the present invention includes a pneumatic transport pressure vessel having funnel-shaped sides and a closed domed top. The pneumatic transport presure vessel has a single inlet/outlet opening at the bottom of the funnel-shaped sides. The pneumatic transport pressure vessel is connected to a switch valve having a pipe section movable between first and second positions. In the first position, the switch valve connects the pneumatic transport pressure vessel to a positive displacement mechanical feeder to bottom load material from a storage hopper through the switch valve into the pneumatic transport pressure vessel. In the second position, the pipe section of the switch valve connects the pneumatic transport pressure vessel to discharge piping for conveying the material pneumatically to a desired discharge location.

6 Claims, 2 Drawing Sheets

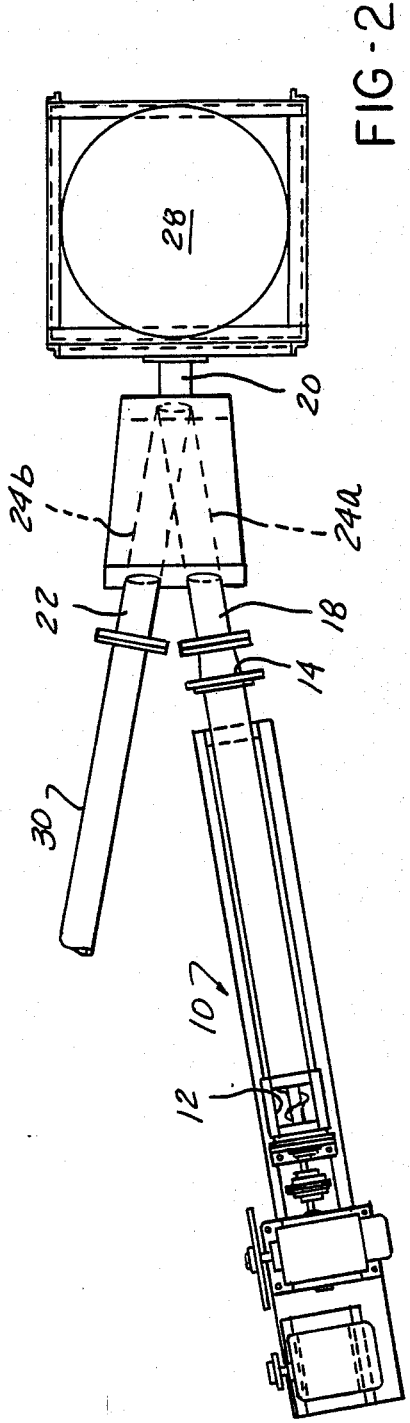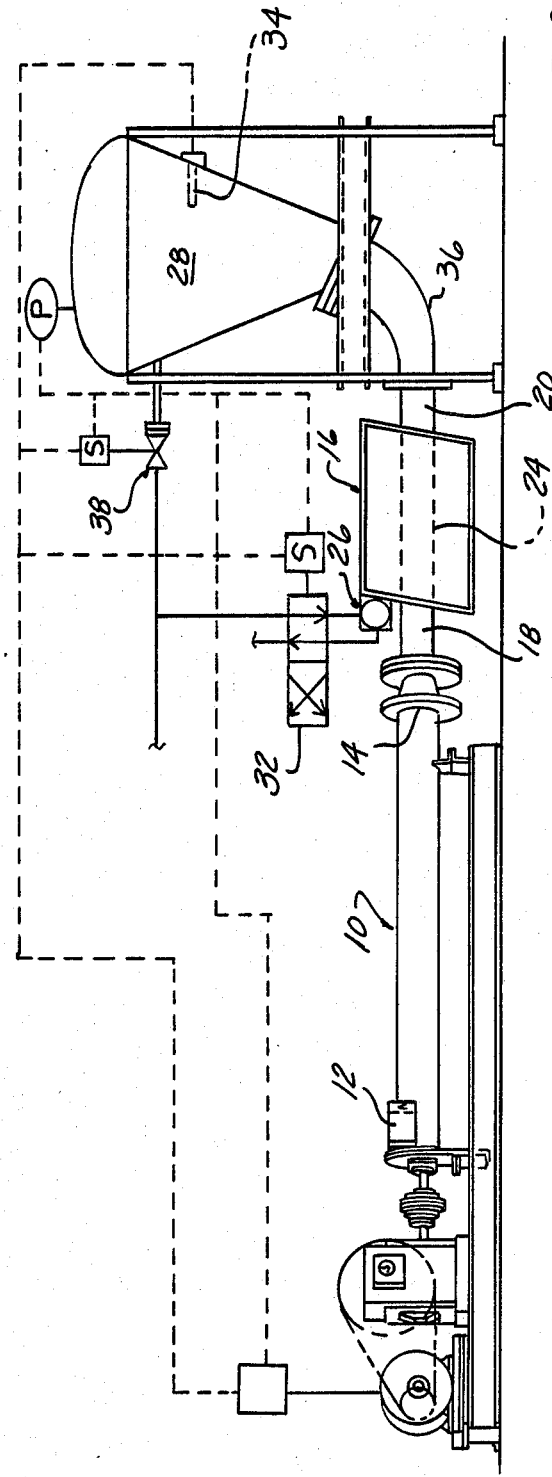

4,938,637

METHOD AND APPARATUS FOR BOTTOM LOADING A PNEUMATIC TRANSPORT PRESSURE VESSEL

FIELD OF THE INVENTION

This invention relates to pneumatic conveyance of materials, and more particularly, to a method and apparatus for bottom loading a pneumatic transport pressure vessel.

BACKGROUND OF THE INVENTION

It is generally known in the art to use a top loading gravity flow apparatus for charging bulk materials to a pneumatic transport pressure vessel. Typically, these conventional top loading gravity flow devices require high headroom and a large amount of horizontal plant floor area. In many existing facilities, the required amount of headroom and plant floor space is limited and the conventional gravity flow top loading apparatus is not economical. In the conventional system, material chips, such as wet or dry metal chips (with or without coolant fluid), are conveyed to a vibrating storage hopper mounted above the transport pressure vessel which stores material for subsequent gravity feeding to the pneumatic transport pressure vessel. An inclined screw conveyor elevates the chip materials above the pneumatic transport pressure vessel for top loading by gravity feed from the discharge of the vibrating storage hopper. The top of the pneumatic transport pressure vessel is sealed by means of a dual valve configuration allowing pressurization of the pneumatic transport pressure vessel for conveying.

It is generally known in the art to use switch valves for switching the connection from the discharge of the pneumatic transport pressure vessel between two alternate discharge pipes leading to different discharge collection points. Many of these switch valves use an inflatable pneumatic seal which is unacceptable for use in conveying metal chips, since the metal chips readily puncture the inflatable pneumatic seal. In addition, many of these switch valves are limited in use to applications where the switch valve is clear or empty of material when actuated or switched, and are typically used only for switching between two alternate discharge piping outlets.

SUMMARY OF THE INVENTION

The present invention includes a horizontally disposed screw feeder which has a material inlet at one end and discharges through a switch valve in a first position into the interior of a pneumatic transport pressure vessel. After the pneumatic transport pressure vessel has been filled to the desired level, the screw feeder stops and the switch valve is actuated to connect the pneumatic transport pressure vessel to the discharge pipe outlet. After the switch valve has connected the pressure vessel to the discharge pipe outlet, the pneumatic transport pressure vessel is pressurized forcing the chip materials through the switch valve and into the discharge piping. Upon completing the discharge of the chip materials, the switch valve is again actuated to return to the first position connecting the discharge of the screw feeder to the pneumatic transport pressure vessel for subsequent loading, and the above described cycle is repeated. The bottom loading configuration for the apparatus is desirable in that it eliminates the high headroom requirements necessary with gravity loading and also reduces the cost of the system by reducing the length of the screw feeder equipment and by eliminating the dual valve seal previously required at the top of the pneumatic transport pressure vessel to obtain the necessary seal required for pressurizing the pneumatic transport pressure vessel for pneumatic conveying or transporting.

The switch valve assembly according the present invention replaces the inflatable pneumatic seals previously used with a plastic ring-shaped piston seal which is slidably disposed in an annular slot and sealed with a rubber O-ring seal on either side. An inlet allows pressurized air to engage one side of the plastic ring-shaped piston seal which forces the plastic ring outwardly into engagement with the side wall through which the pipe communicates with the flanged inlets and outlets. Air is released from the piston chamber to disengage the plastic seal prior to activation of the switch valve to move the bias cut pipe connection from the first position to the second position. The plastic ring-shaped piston seal allows pneumatic conveying of metal chips, since the plastic ring-shaped piston seal is resistant to damage from the metal chips. In addition, the switch valve operating mechanism and actuator have been modified to allow the present switch valve to be switched or moved from one position to the other position when full of material to be conveyed. Furthermore the present switch valve has been further modified to include means for closing the unused pipe opening when the switch valve pipe is communicating with the other pipe opening.

Other objects and features of the invention will become apparent by reference to the following specification and to the drawings.

BRIEF DESCRIPTION OF THE DRAWINGS

The present invention will be better understood in its most important aspects in the ensuing description of a preferred embodiment, given by way of non-limiting example only and illustrated in the accompanying drawings, wherein like references numerals refer to similar elements throughout the various views.

FIG. 1 is an elevational view of an apparatus for bottom loading a pneumatic transport pressure vessel according to the present invention;

FIG. 2 is a plan view of the invention shown in FIG. 1;

DESCRIPTION OF THE PREFERRED EMBODIMENTS

Figure 4:
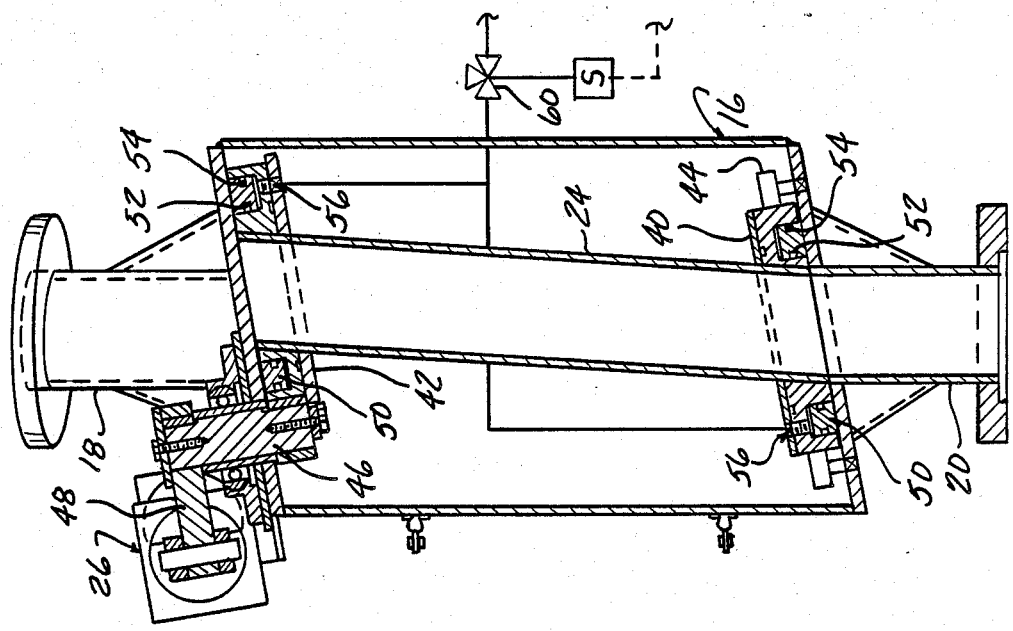
FIG. 4 is a cross-sectional view of the switch valve taken as shown in FIG. 3.

The present invention of an apparatus for bottom loading a pneumatic transport pressure vessel includes a horizontally disposed screw feeder 10 having a material inlet 12 at one end and a material discharge outlet 14 at another end. The screw feeder 10 discharges through a switch valve 16. The switch valve 16 includes three pipe connections designated 18, 20 and 22. A movable bias cut pipe section 24 is disposed within the switch valve 16. The bais cut pipe section 24 is movable between a first position 24a and a second position 24b by fluid pressure actuated motor means 26. In the first position 24a, the pipe section 24 is in communication with the pipe connections designated 18 and 20. The pipe connection 18 connects the switch valve 18 to the horizontally disposed screw feeder 10, while the pipe connection 20 connects the switch valve 16 to the bottom of the pneumatic transport vessel 28. In the second position 24b, the pipe section 24 is in communication with the pipe connections 20 and 22. Pipe connection 22 connects the pneumatic transport pressure vessel 28 through the pipe section 24 to discharge piping 30 for pneumatic conveying or transporting of the material to a desired location. The fluid pressure actuator means 26 is controlled by valve means 32 for switching pressurized fluid between first and second fluid chambers, wherein the fluid pressure actuated means 26 includes an operatively moveable piston reciprocally disposed within a cylinder for movement between first and second end limits of movement, thereby moving the pipe section 24 of the switch valve 16 between the first and second positions 24a and 24b, respectively.

The pneumatic transport pressure vessel 28 includes an inverted truncated conical vessel side wall with a domed top, and a reducing elbow pipe connection connecting the pneumatic transport pressure vessel 28 to the pipe connection 20 of the switch valve 16. The reducing elbow connection 36 acts as the single inlet/outlet for material to be transported into and out of the pneumatic transport pressure vessel 28. Material level sensing means 34 is provided within the pneumatic transport pressure vessel 28 for indicating that material has reached a desired level within the pneumatic transport pressure vessel 28 during loading. The sensing means 34 is connected through appropriate circuitry to stop the screw feeder 10 upon sensing that the material level within the vessel 28 is at the desired level. The control valve means 32 is then activated to operate the fluid pressure actuated means 26, thereby moving the pipe section 24 from the first position 24a to the second position 24b. Upon completion of the movement of the pipe section 24 to the second position 24b, second control valve means are actuated to introduce pressurized fluid, such as compressed air, into the vessel 28 adjacent the top. The compressed air enters the vessel 28 above the material level within the vessel 28. Compressed air enters the funnel shaped transport pressure vessel 28 to partially fluidize the static load of material contained therein. The air pressure then squeezes the load of material into a cylinder entering the conveying pipeline for transportation to the desired discharge point.

In the present invention, an air header pipe valve assembly controls the compressed air supply to the funnel-shaped pressure vessel which, when pressurized, initiates the material conveying cycle. The transition elbow 36 attached to the bottom of the vessel 28 completes the reforming of the partially fluidized wet or dry materials into a cylinder for pneumatic conveying through the pipeline. The funnelization of material into a cylinder during partial fluidization permits the material to be reshaped for delivery to and through four-inch diameter pipelines. The cylinder of material is accelerated by the compressed air entering the pressure vessel which provides the propelling force to complete the conveying distance through the pipeline to the discharge point. As soon as the conveying distance is accomplished, the air pressure drops to near atmospheric, and the compressed air supply is terminated by the second control valve means 38.

The pneumatic conveying system is then ready for the next batch of material to be loaded. The control valve means 32 is then activated to operate fluid pressure actuated means 26 to move the pipe section 24 of the switch valve 16 from the second position 24b to the first position 24a. After reaching the first position 24a, the screw feeder 10 is activated to load the next batch of material into the pneumatic transport pressure vessel 28.

Figure 3:
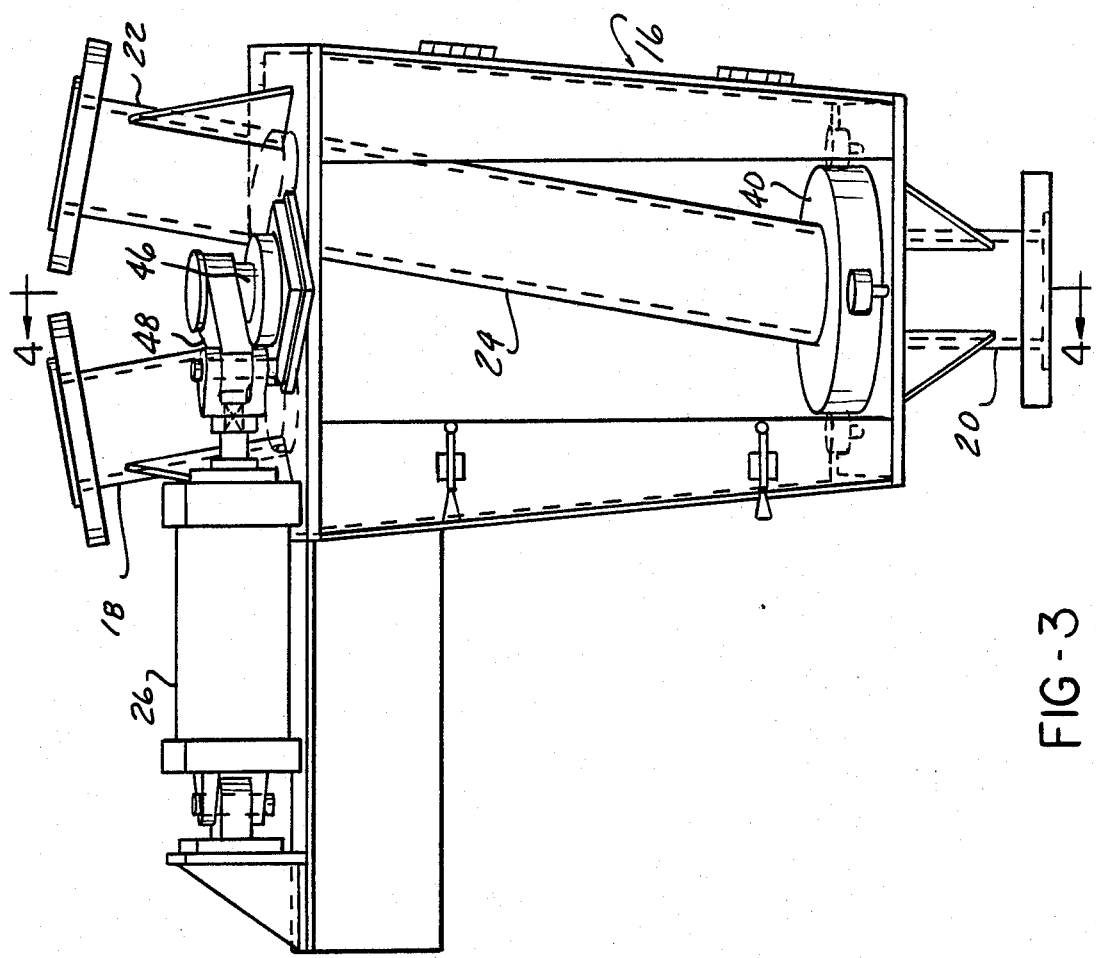
FIG. 3 is a detailed plan view of a switch valve used in the present invention.

Referring now to FIGS. 3 and 4, the switch valve 16 used in the present invention is shown in greater detail. FIG. 3 shows a plan view of the switch valve 16 with a door removed for clarity. FIG. 4 is a sectional view of the switch valve 16 taken as shown in FIG. 3 with the pipe section 24 shown rotated between the first and second positions. The switch valve 16 includes the pipe section 24 having first and second sealing ring housings 40 and 42, respectively, at opposite ends thereof. A plurality of cam followers 44 are disposed around the first sealing ring housing 40 adjacent the end of the switch valve 16 where the pipe section 24 connects to the pipe connection 20. The cam followers 44 maintain the first sealing ring housing 40 in position while allowing rotary movement of the pipe section 24 within the switch valve housing between the first and second positions 24a and 24b, respectively.

The second sealing ring housing 42 is connected to a pivot shaft 46 passing through a wall of the enclosure housing the pipe section 24 adjacent the pipe connections 18 and 20, respectively. The pivot shaft 46 is operably connected to the fluid pressure actuator means 26 through pivot linkage arm 48. As the fluid pressure actuated means 26 is reciprocated between the first and second end limits of movement, the reciprocal motion is transformed into rotary motion through the linkage arm, thereby driving the pivot shaft 46 and second sealing ring housing 42 in pivotal movement about the longitudinal axis of the pivot shaft 46. The rotary motion of the pivot shaft 46 and second sealing ring housing 42 causes the pipe section 24 to move between the first and second positions 24a and 24b to switch to the desired pipe connection.

Each sealing ring housing is connected to the pipe section 24 and includes an annular groove formed in a face of the sealing ring housing facing outwardly toward the immediately adjacent wall of the enclosure of the switch valve 16. A sealing ring 50, preferably made of a plastic material, is slidably disposed within each annular groove. The sealing ring 50 is sealed with an inner diameter O-ring seal 52 and an outer diameter O-ring seal 54. A chamber is formed between the sealing ring housing and the sealing ring by means of the inner and outer diameter O-ring seals 52 and 54, respectively. Pressurized fluid, such as compressed air, is in fluid communication with the chamber through pipe connection 56 for operatively engaging the sealing ring against the enclosure wall when the pipe section 24 has reached the first or second position 24a and 24b. The sealing ring 50 is preferably selected from a plastic material which is resistant to the material being transported, such as abrasive metal chips, while allowing sealing engagement of the plastic seal ring against the wall of the enclosure. Control valve means 60 are provided to pressurize and depressurize the chamber which seats the seal ring against the wall of the enclosure. Preferably, the chamber is depressurized before moving the pipe section 24 between the first and second positions.

In operation, the present pneumatic conveying system begins a cycle with the pipe section 24 in the first position 24a and with sealing rings 50 engaged against the wall of the enclosure by applying pressurized fluid through valve control means 60 and pipe connection 56. The screw feeder 10 is operated to draw material from a storage hopper (not shown) through material inlet 12 and is discharged through discharge outlet 14. The material discharged passes through pipe connection 18 of switch valve 16, through pipe section 24 and out through pipe connection 20. The material is then forced by continued operation of the screw feeder 10 through transition elbow 36 and into the pneumatic transport pressure vessel 28. After a sufficient quantity of material has been transferred by the screw feeder 10 into the pneumatic transport pressure vessel 28, the sensing means 34 is activated by the level of material. On activation of the sensing means 34, the screw feeder 10 is deactivated, control valve means 60 depressurizes the seal rings 50, control valve means 32 operates fluid pressure actuated means 26 to switch the pipe section 24 from the first position 24a to the second position 24b, control valve means 60 repressurizes sealing rings 50 and second control valve means 38 opens to partially fluidize the static load of material contained within the pneumatic transport pressure vessel 28. The air pressure then squeezes the load of material, such as metal chips, into a cylinder as it passes out of the pneumatic transport pressure vessel 28 through transition elbow 36, pipe connection 20, pipe section 24, pipe connection 22 and thereafter entering the discharge piping 30 for transporting to the terminal point for final discharge into a receiving hopper (not shown). After discharge, the air pressure within the pneumatic transport pressure vessel 28 drops to near atmospheric and the second control valve means 38 is deactivated by control logic pressure sensor P. The control valve means 60 then depressurizes the seal rings 50 and the control valve means 32 is activated to operate the fluid pressure actuated means 26 to move the pipe section 24 from the second position 24b to the first position 24a. On reaching the first position 24a, the control valve means 60 repressurizes the chamber within the sealing ring housings to drive the sealing rings in sealing engagement against the wall of the switch valve enclosure. The screw feeder 10 is then activated to load the pneumatic transport pressure vessel with another batch of material.

While one embodiment of the invention has been described in detail, it will be apparent to those skilled in the art that the disclosed embodiment may be modified. Therefore, the foregoing description is to be considered exemplary, rather than limiting, and the true scope of the invention is that defined in the following claims.

What is claimed is:

1. A pneumatic transport system comprising the combination of:
   a pneumatic transport pressure vessel having a funnel-shaped side wall and a closed dome top, the pneumatic transport pressure vessel having a single material inlet/outlet at the bottom of the funnel-shaped side wall;
   switch valve means connected to the single material inlet/outlet of the pneumatic transport pressure vessel for connecting the pneumatic transport pressure vessel selectively with an inlet pipe connection and an outlet pipe connection;
   discharge piping means connected to the outlet pipe connection for conveying the material to a desired discharge location; and
   positive displacement mechanical feeder means connected to the inlet pipe connection for bottom loading the pneumatic transport pressure vessel.

2. The pneumatic transport system of claim 1, wherein the positive displacement mechanical feeder means comprises a horizontally disposed screw conveyor.

3. The pneumatic transport system of claim 1, wherein the switch valve means comprises:
   an enclosure having a pressure vessel pipe connection at one end, wherein said pressure vessel pipe connection is connected to said material inlet/outlet, and the inlet pipe connection and the outlet pipe connection at another end;
   a bias cut pipe section disposed within the enclosure movable between a first position wherein the inlet pipe connection is connected to the pressure vessel pipe connection and a second position wherein the outlet pipe connection is connected to the pressure vessel pipe connection;
   a first seal ring housing connected to the pipe section at one end adjacent the pressure vessel pipe connection through the enclosure, the first seal ring housing having an annular groove facing the enclosure, a first plastic seal ring reciprocally disposed within the annular groove and sealed with respect to the first seal ring housing with an inner diameter O-ring seal and an outer diameter O-ring seal forming an expansible fluid chamber between the first seal ring and the first seal ring housing;
   a second seal ring housing connected to the pipe section adjacent the inlet pipe connection and the outlet pipe connection through the enclosure, the second seal ring housing having an annular groove formed facing the enclosure and a second plastic seal ring reciprocally disposed within the annular groove and sealed with respect to the second seal ring housing with an inner diameter O-ring seal and an outer diameter O-ring seal forming an expansible fluid chamber between the second seal ring and the second seal ring housing;
   fluid pressure actuated means for moving the pipe section between the first position and the second position; and
   control valve means in fluid communication with the fluid pressure chambers within the first and second seal ring housings for sealing and unsealing the seal rings with respect to the enclosure when in the first and second positions.

4. A pneumatic conveying system comprising:
   a pneumatic transport pressure vessel having a funnel-shaped sidewall and a closed dome top, the pressure vessel further having a single material inlet/outlet at the bottom of the funnel-shaped sidewall;
   a switch valve connected to the single material inlet/outlet of the pneumatic transport pressure vessel for connecting the pressure vessel selectively with an inlet pipe connection and an outlet pipe connection, the switch valve including an enclosure having a pressure vessel pipe connection at one end, wherein said pressure vessel pipe connection is connected to said material inlet/outlet, and the inlet pipe connection and the outlet pipe connection at another end, a bias cut pipe section disposed within the enclosure movable between a first position wherein the inlet pipe connection is connected to the pressure vessel pipe connection and a second position wherein the outlet pipe connection is connected to the pressure vessel pipe connection, a first seal ring housing connected to the section at one end adjacent the pressure vessel pipe connection through the enclosure, the first seal ring housing having an annular groove facing the enclosure, a first plastic seal ring reciprocally disposed within the annular groove and sealed with respect to the first seal ring housing with an inner diameter O-ring seal and an outer diameter O-ring seal forming an expansible fluid chamber between the seal ring and the first seal ring housing, a second seal ring housing connected to the pipe section adjacent the inlet pipe connection and the outlet pipe connection through the enclosure, the second seal ring housing having an annular groove formed facing the enclosure, a second plastic seal ring reciprocally disposed within the annular groove and sealed with respect to the second seal ring housing with an inner diameter O-ring seal and an outer diameter O-ring seal forming an expansible fluid chamber between the second seal ring and the second seal ring housing, fluid pressure actuated means for moving the pipe section between the first position and the second position, and control valve means in fluid communication with the fluid pressure chambers within the first and second seal ring housings for sealing and unsealing the first and second seal rings with respect to the enclosure when in the first and second positions;

outlet piping means connected to the discharge pipe connection of the switch valve for pneumatically conveying the material to a desired discharged location; and a horizontally disposed positive displacement screw conveyor means connected to the inlet pipe connection of the switch valve for bottom loading the pneumatic transport pressure vessel.

5. A method for pneumatic conveying comprising the steps of:

positively displacing material through a switch valve with mechanical feeder means against gravitational forces into a pneumatic transport pressure vessel, wherein the switch valve is in a first position communicating the positive displacement mechanical feeder means with the pneumatic transport pressure vessel, the pressure vessel having a single material inlet/outlet with upwardly and outwardly extending funnel-shaped side walls and a closed dome top;

activating a material level sensing switch within the pneumatic transport pressure vessel when a predetermined amount of material has been disposed within the pneumatic transport pressure vessel by the positive displacement mechanical feeder means;

after the level switch is activated, deactivating the positive displacement mechanical feeder means and actuating a switch valve actuator to move the switch valve to a second position communicating the pneumatic transport pressure vessel with discharge piping means;

after completion of the switch valve movement, discharging compressed air within the pneumatic transport pressure vessel to partially fluidize the static load of material contained therein and to squeeze the load of material into a cylinder which enters the discharge piping means and is pushed at a slow conveying speed through the discharge piping means to a terminal point for final discharge into a receiving hopper;

sensing a decrease in pressure within the pneumatic transport pressure vessel on completion of the transfer of material;

terminating communication of compressed air within the pneumatic transport pressure vessel after sensing the decrease in pressure;

activating the switch valve actuator to move the switch valve from the second position to the first position; and after completion of the switch valve movement, reactivating the positive displacement mechanical feeder.

6. The method for pneumatic conveying of claim 5, further comprising the steps of:

pressurizing expansible chambers within the switch valve for reciprocally driving a plastic sealing ring into engagement with a wall of an enclosure of the switch valve to seal a movable pipe section within the switch valve with respect to the enclosure when in the first and second positions; and depressurizing the expansible chamber prior to movement of the pipe section from one position to another position.

* * * * *